US008351515B2

(12) United States Patent
Kuroki

(10) Patent No.: US 8,351,515 B2
(45) Date of Patent: Jan. 8, 2013

(54) CONTENT RECORDING APPARATUS AND METHOD

(75) Inventor: Daisuke Kuroki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1355 days.

(21) Appl. No.: 11/769,878

(22) Filed: Jun. 28, 2007

(65) Prior Publication Data

US 2008/0008054 A1 Jan. 10, 2008

(30) Foreign Application Priority Data

Jul. 6, 2006 (JP) ................................ 2006-186975

(51) Int. Cl.
*H04N 11/04* (2006.01)
*H04N 5/76* (2006.01)
*H04N 9/80* (2006.01)
*H04N 5/92* (2006.01)

(52) U.S. Cl. .................. 375/240.26; 386/235; 386/239; 386/241; 386/326

(58) Field of Classification Search ........................ None
See application file for complete search history.

(56) References Cited

U.S. PATENT DOCUMENTS

| | | | | |
|---|---|---|---|---|
| 7,627,530 | B2 * | 12/2009 | Siegel et al. | 705/57 |
| 2003/0012430 | A1 * | 1/2003 | Risson | 382/165 |
| 2003/0031368 | A1 * | 2/2003 | Myler et al. | 382/228 |
| 2004/0156559 | A1 * | 8/2004 | Cheng et al. | 382/286 |
| 2004/0168193 | A1 * | 8/2004 | Hirose | 725/70 |
| 2005/0219362 | A1 * | 10/2005 | Garoutte | 348/180 |
| 2005/0259740 | A1 * | 11/2005 | Kobayashi et al. | 375/240.16 |
| 2006/0268918 | A1 * | 11/2006 | Olexa et al. | 370/432 |
| 2007/0120863 | A1 * | 5/2007 | Kim et al. | 345/581 |

FOREIGN PATENT DOCUMENTS

| | | | |
|---|---|---|---|
| JP | 2001-275072 | | 10/2001 |
| JP | 2003-153152 | A | 5/2003 |
| JP | 2004-134010 | A | 4/2004 |
| JP | 2007-73123 | A | 3/2007 |
| JP | 2007073123 | A * | 3/2007 |

* cited by examiner

*Primary Examiner* — Nathan Flynn
*Assistant Examiner* — Trang Doan
(74) *Attorney, Agent, or Firm* — Fitzpatrick, Cella, Harper & Scinto

(57) ABSTRACT

A plurality of items of content whose meaning content is the same and quality is different is acquired from a plurality of acquisition routes and managed as a single group. Each item of content in this group is analyzed, an evaluation value of each item of content is calculated from the results of analysis and content to be deleted is determined based upon the evaluation values.

7 Claims, 5 Drawing Sheets

FIG. 2

201

CONTENT INFORMATION TABLE

202

CONTENT GROUP 1: CONTENT NAME: DRAMA A

| No | ACQUISITION ROUTE | RECORDING TIME | AMOUNT OF DATA | NOISE | RESOLU-TION | CM | TELOP | EVALUATION VALUE |
|---|---|---|---|---|---|---|---|---|
| 1-1 | ANALOG BROADCAST | 53min | 2011MB | | | | | |
| 1-2 | DIGITAL TERRESTRIAL | 53min | 6400MB | | | | | |
| 1-3 | INTERNET (URL : ......) | 45min | 2504MB | | | | | |
| 1-4 | HOUSEHOLD LAN | 48min | 1023MB | | | | | |

204 205 206

203

CONTENT GROUP 2: CONTENT NAME: SPORTS B

| No | ACQUISITION ROUTE | RECORDING TIME | AMOUNT OF DATA | NOISE | RESOLU-TION | CM | TELOP | EVALUATION VALUE |
|---|---|---|---|---|---|---|---|---|
| 2-1 | INTERNET (URL : ......) | 192min | 9039MB | 10 | 5 | 10 | 10 | 8.6 |
| 2-2 | DIGITAL BS | 190min | 6400MB | 7 | 8 | 10 | 10 | 8.1 |

...

FIG. 3

201

CONTENT INFORMATION TABLE

CONTENT GROUP 1: CONTENT NAME: DRAMA A

301

| No | ACQUISITION ROUTE | RECORDING TIME | AMOUNT OF DATA | NOISE | RESOLU-TION | CM | TELOP | EVALUATION VALUE |
|---|---|---|---|---|---|---|---|---|
| 1-1 | ANALOG BROADCAST | 53min | 2011MB | 8 | 5 | 5 | 8 | 6.7 |
| 1-2 | DIGITAL TERRESTRIAL | 53min | 6400MB | 9 | 10 | 7 | 10 | 9.1 |
| 1-3 | INTERNET (URL : ......) | 45min | 2504MB | 10 | 5 | 10 | 10 | 8.6 |
| 1-4 | HOUSEHOLD LAN | 48min | 1023MB | 5 | 3 | 5 | 10 | 5.1 |

205 206

CONTENT GROUP 2: CONTENT NAME: SPORTS B

302

| No | ACQUISITION ROUTE | RECORDING TIME | AMOUNT OF DATA | NOISE | RESOLU-TION | CM | TELOP | EVALUATION VALUE |
|---|---|---|---|---|---|---|---|---|
| 2-1 | INTERNET (URL : ......) | 192min | 9039MB | 10 | 5 | 10 | 10 | 8.6 |

...

CONTENT RECORDING APPARATUS AND METHOD

BACKGROUND OF THE INVENTION

1. Field of the Invention

The present invention relates to a technique for acquiring content from content acquisition routes, which include broadcast radio waves and networks, and recording the content.

2. Description of the Related Art

Advances continue to be made in broadcast techniques such as digital terrestrial broadcasting and satellite broadcasting, and network infrastructure for ADSL (Asymmetric Digital Subscriber Line) and optical fiber, etc., is being built. This has been accompanied by the ability to acquire content the semantic substance of which is identical although the format and amount of data, etc., differ.

For example, in a case where a certain drama program is to be viewed, it is possible to view the drama upon receiving it over various routes, such as by broadcast or re-broadcast by digital terrestrial broadcasting, analog terrestrial broadcasting and cable TV, and by distribution over the Internet. Although there is the possibility that each item of content will differ in terms of resolution, the presence or absence of commercial messages (CM) and the length thereof, the content is identical in terms of semantic substance, i.e., a drama.

It should be noted that examples of differences between such content are a difference in the image quality of the content owing to a difference in resolution, and whether or not redundant data unrelated to the content is included owing to the presence or absence of CM and length thereof.

Further, it is possible to record a large quantity of content by mounting a large-capacity storage medium as typified by an HDD (hard-disk drive) recorder. In addition, favored content or content desired to be saved can be recorded on a DVD (Digital Versatile Disk) or the like and thus preserved for future use.

The recording capacity of storage media such as hard-disk drives will increase greatly in the future as the technology advances. Accordingly, content recording devices having large-capacity storage media such as HDD recorders will be able to record content in greater quantity.

An information recording apparatus that has been proposed heretofore is so adapted that if a program that the user likes included among recorded programs has image quality that is unsatisfactory, then this program is re-recorded. For example, see the specification of Japanese Patent Application Laid-Open No. 2001-275072 (Patent Document 1).

However, the quality of content, such as the image quality and sound quality, the presence or absence of redundant data unrelated to the content, the content itself, the route by which the content was acquired and the circumstances at the time of content acquisition, differs.

For example, with regard to the content itself, the quality of the content is influenced by the method that was used to compress the content, the bit rate, the presence or absence of CM and the length thereof, and the unexpected inclusion of Telop such as that of a news flash. With regard to the route of content acquisition, the quality of the content differs depending upon whether it was acquired by analog broadcast or by digital broadcast. As for the circumstances of the time of content acquisition, the quality of content is affected by the influence of weather on radio waves, the presence of noise in the content owing to the load on a network, and resolution.

Accordingly, even if content is viewed and then re-acquired because the quality thereof is unsatisfactory, the quality of the re-acquired content will not necessarily be better than that previously Further, there is also the possibility that good-quality content the semantic substance of which is identical will be obtained from another route of acquisition.

A problem which arises is that in order to judge the quality of content, the user must verify the content fully and then pass judgment. Another problem is that in a case where there are multiple items of content of the same semantic substance acquired over various routes, a great deal of time and effort is required for verification for the purpose of preserving content of good quality.

SUMMARY OF THE INVENTION

According to an embodiment of the present invention, to record good-quality content without requiring that the user perform a troublesome operation is realized.

According to one aspect of the present invention, there is provided a content recording apparatus comprising: an input unit adapted to input a plurality of items of content that meaning content is the same and quality is different; a content analysis unit adapted to analyze the quality of content by converting the quality of content to a numerical value; and a recording control unit adapted to record the plurality of items of content on a storage medium, or delete content that has been recorded on the storage medium, based upon results of analysis by the content analysis unit.

According to another aspect of the present invention, there is provided a content recording method comprising: inputting a plurality of items of content that meaning content is the same and quality is different; analyzing the quality of content by converting the quality of content to a numerical value; and recording the plurality of items of content on a storage medium, or deleting content that has been recorded on the storage medium, based upon results of analysis in the analyzing step.

Further features of the present invention will become apparent from the following description of exemplary embodiments (with reference to the attached drawings).

BRIEF DESCRIPTION OF THE DRAWINGS

FIG. 2 is a diagram illustrating an example of the composition of a content information table according to this embodiment;

FIG. 3 is a diagram illustrating the state of the content information table after content analysis, output of evaluation values and deletion of content;

DESCRIPTION OF THE EMBODIMENT

A preferred embodiment of the present invention will now be described in detail with reference to the drawings.

Figure 1:
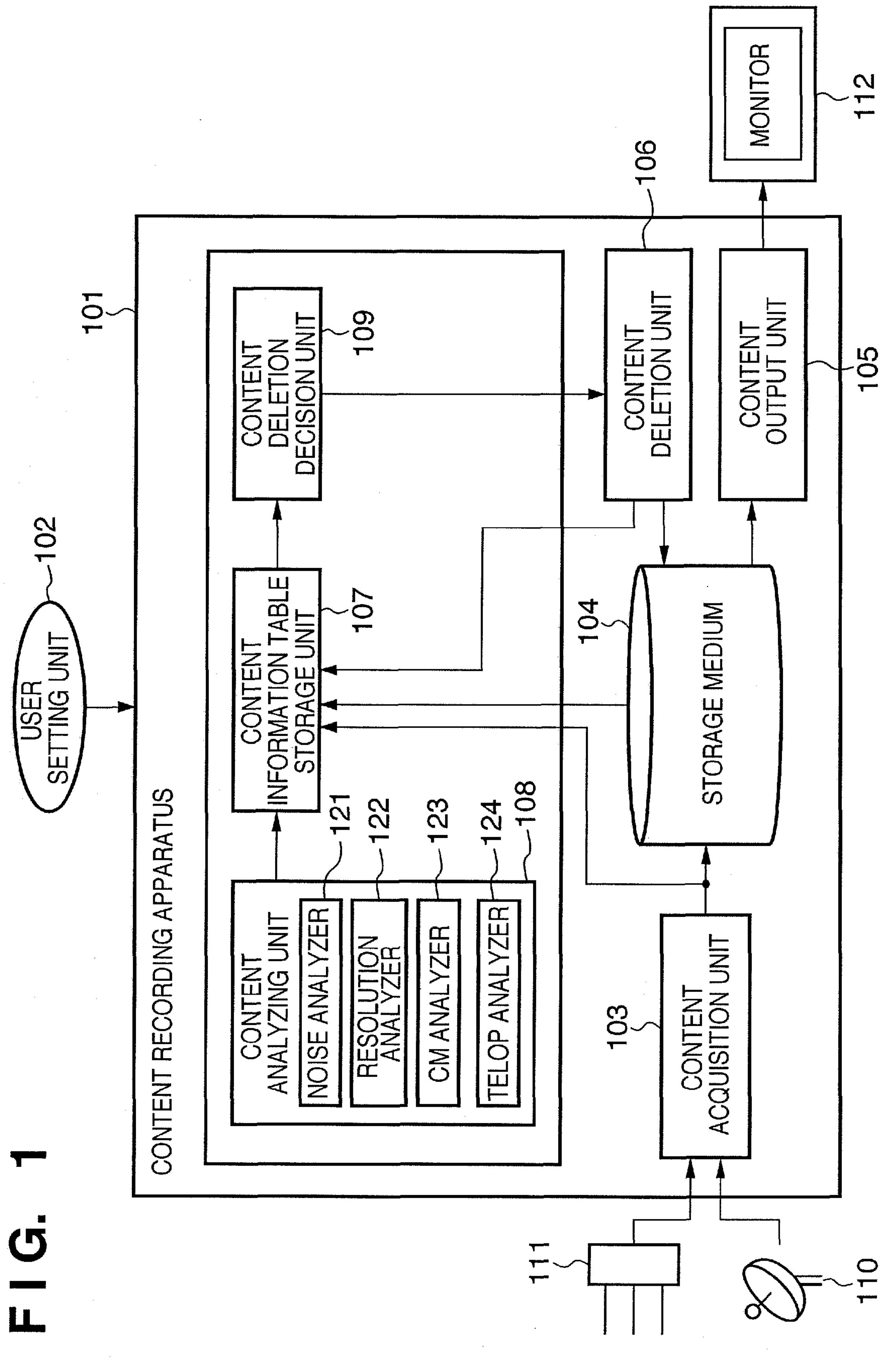
FIG. 1 is a diagram illustrating an example of the structure of a content recording apparatus according to an embodiment of the present invention.

FIG. 1 is a diagram illustrating an example of the structure of a content recording apparatus 101 according to an embodiment of the present invention. As shown in FIG. 1, the content recording apparatus 101 includes a content information table storage unit 107, a content analyzing unit 108 and a content deletion decision unit 109. A user setting unit 102 is employed by the user to make settings relating to content deletion, acquisition and output.

An antenna 110 receives broadcast radio waves. The apparatus is connected to a network 111 such as the Internet or a LAN. A content acquisition unit 103 acquires multiple items of content, the semantic substance of which is identical, via the antenna 110 or network 111. A storage medium 104 is a large-capacity hard disk that stores acquired content.

A monitor 112 displays content. A content output unit 105 outputs content, which has been stored on the storage medium 104, to the monitor 112. In response to a content-deletion command received from the content deletion decision unit 109 or user setting unit 102, a content deletion unit 106 deletes content.

The content information table storage unit 107 stores a content information table for managing content stored by the storage medium 104. The content analyzing unit 108 has four analyzers for analyzing content, namely a noise analyzer 121, a resolution analyzer 122, a CM analyzer 123 and a Telop analyzer 124. The noise analyzer 121 judges amount of noise, the resolution analyzer 122 judges resolution and the CM analyzer 123 judges whether there are commercial messages and the length thereof in terms of time. The Telop analyzer 124 determines whether Telop such as a news flash is present or not and the length of time of Telop inclusion.

The content deletion decision unit 109 decides content to be deleted by applying an evaluation function to the result of content analysis.

The content information table handles a plurality of items of content the semantic substance of which is identical as one group and records the result of analysis by the content analyzing unit 108 and the result of evaluation by the content deletion decision unit 109.

The content recording apparatus 101 acquires a plurality of items of content the semantic substance of which is identical from the user setting unit 102, records the content and manages the content. The content recording apparatus 101 then analyzes the content and applies the evaluation function, thereby converting the quality of the content to a numerical value, decides the content to be deleted and then deletes this content. Accordingly, content considered highly evaluated and excellent in quality can be obtained from a plurality of items of content the semantic substance of which is identical.

Further, in response to setting of content desired to be acquired by the user, the content acquisition unit 103 acquires a plurality of items of content the semantic substance of which is identical via the antenna 110 or network 11 and records these items of content on the storage medium 104.

Further, information of the same content having different acquisition routes is recorded and managed in the content information table stored in the content information table storage unit 107.

Content acquisition routes include radio-wave broadcasting such as analog terrestrial, analog BS and digital terrestrial, cable TV, the Internet and a content server connected to a LAN. If the route is radio-wave broadcast or cable TV, then broadcast or re-broadcast of content is received.

If the route is the Internet or a content server, then distribution of content is received or the user goes to acquire the content per se. By using a content guide such as EPS (Electronic Program Guide) in the setting of content by the user, a plurality of items of content the semantic substance of which is identical can be searched and acquired. Items of content the semantic substance of which is identical is managed as one group by the content information table.

Next, after content is acquired, the content analyzing unit 108 analyzes each item of content and makes a conversion to a numerical value for every analyzed item. The content analyzing unit 108 of this embodiment has the four analyzers 121 to 124 as analysis engines for analyzing content. It should be noted that it is possible to increase the number of items analyzed by adding on analyzers such as a bit-rate analyzer and compression scheme analyzer to supplement the analyzers for the four above-mentioned items.

The content deletion decision unit 109 thenceforth calculates the final evaluation value of each item of content by applying an evaluation function obtained by weighting the analytical result put into numerical form by the content analyzing unit 108. The calculated evaluation value is registered in the content evaluation table within the content information table storage unit 107. The content deletion decision unit 109 decides the content to be deleted based upon the evaluation value for every group of content the semantic substance of which is identical, and instructs the content deletion unit 106 accordingly.

The above-mentioned evaluation value is used as an indicator for comparing the qualities between items of content; content having the highest evaluation value is considered to have a quality better than that of any of the other items of content. Content to be deleted is decided for deletion from content other than that having the highest evaluation value. As a result, content having the best quality can be obtained from among items of content the semantic substance of which is identical.

In response to receipt of the content-deletion command from the content deletion decision unit 109, the content deletion unit 106 deletes the information concerning this content from the content information table and deletes this content that has been recorded on the storage medium 104.

In accordance with a command from the user, the content output unit 105 causes the monitor 112 to display the content that has been recorded on the storage medium 104.

It should be noted that the decision made by the content deletion decision unit 109 concerning content to be deleted is not necessarily limited solely to content other than content having the highest evaluation value. For example, another method of deciding content to be deleted is to present the user with a display of analytical results and evaluation values registered in the content information table and allow the user to judge which content should be deleted.

Further, in a case where content itself is deleted, the fact that a plurality of items of identical content are managed as one group means that the entire group of this content is deleted at one time.

Further, although the content output unit 105 outputs content to the monitor 112, which is a display unit, the content output unit 105 may distribute content via the network 111.

The content information table stored in the content information table storage unit 107 will be described in detail with reference to FIGS. 2 and 3.

FIG. 2 is a diagram illustrating an example of the composition of a content information table according to this embodiment.

As illustrated in FIG. 2, a content information table 201 includes information tables 202, 203 of content groups 1, 2, respectively. The content group 1 is content whose content name is "DRAMA A" acquired from different acquisition routes and managed as information table 202. The content group 2 is content whose content name is "SPORTS B" acquired from different acquisition routes and managed as information table 203.

It should be noted that the content name of a content group is registered when the content to be acquired is set by the user at the user setting unit 102.

Further, in this embodiment, no particular mention is made of a method of acquiring content the semantic substance of which is identical from a plurality of acquisition routes; any method may be applied.

A section 204 contains the items of acquisition route, recording time and amount of data registered when content is acquired. A section 205 contains items of noise, resolution, CM and Telop registered as results of content analysis by the content analyzing unit 108. Evaluation values calculated by the content deletion decision unit 109 using an evaluation function are registered in a section 206.

By way of example, content for which the acquisition route is analog broadcast, the recording time is 53 minutes and the amount of data is 2011 MB has been registered in information table 202 as No. 1-1. Further, content for which the acquisition route is the Internet, the recording time is 45 minutes and the amount of data is 2504 MB has been registered in information table 202 as No. 1-3. The URL of the content is this case has also been registered.

It should be noted that since the content-analysis results 205 and evaluation values 206 have not been registered in the information table 202, the content group 1 is in a state that prevails prior to analysis by the content analyzing unit 108.

On the other hand, content-analysis results and evaluation values have been registered in the information table 203. This means that the content group 2 is in a state that prevails after analysis by the content analyzing unit 108.

FIG. 3 is a diagram illustrating the state of the content information table after content analysis, output of evaluation values and deletion of content. As illustrated in FIG. 3, the section 205 of results of content analysis by the content analyzing unit 108 is registered in an information table 301 of content group 1, and the evaluation values 206 calculated by the content deletion decision unit 109 are also registered in the information table 301. Further, an information table 302 of content group 2 is in a state in which the content that was acquired from "DIGITAL BS" has been deleted as unnecessary content by the content deletion unit 106.

Figure 4:
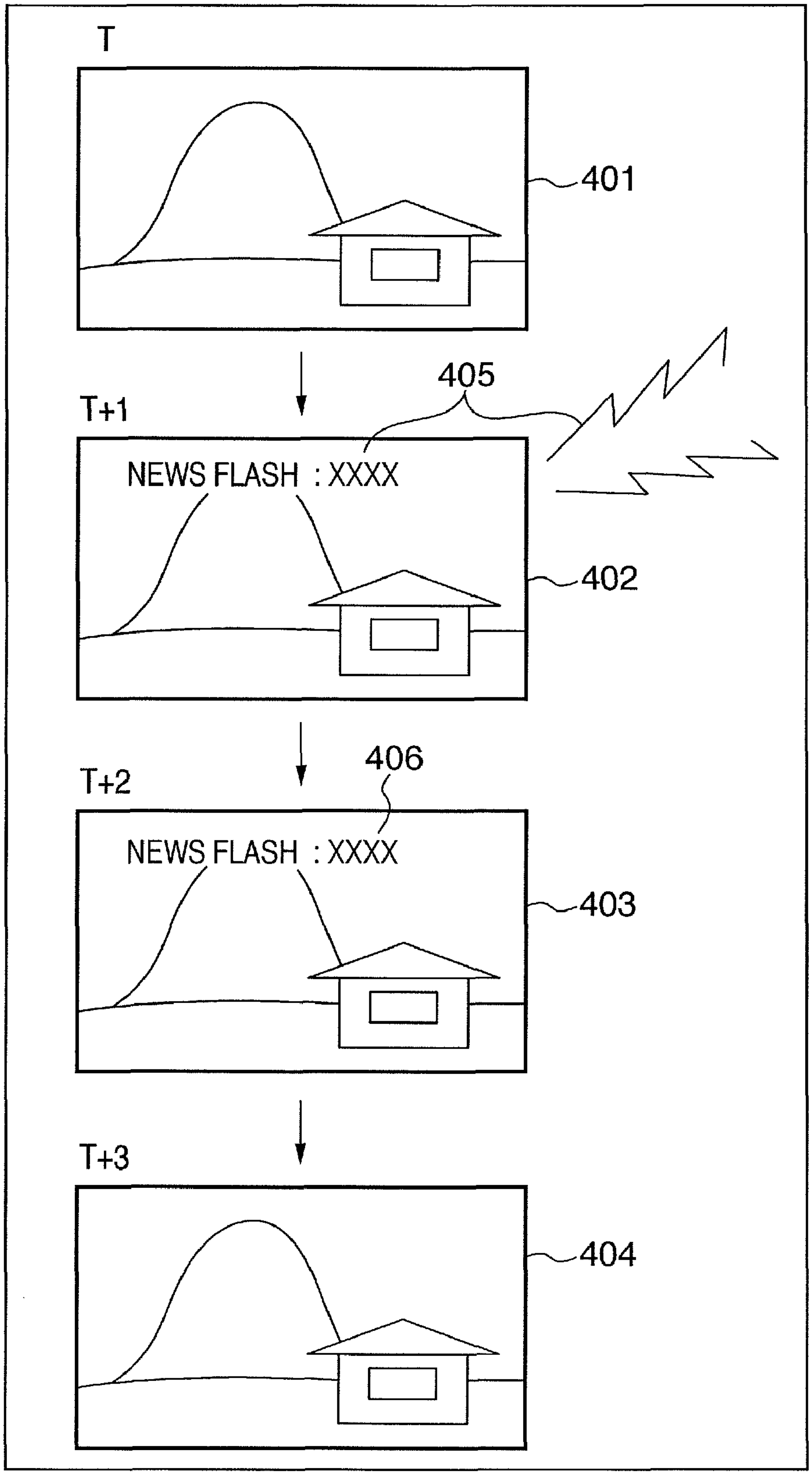
FIG. 4 is a diagram useful in describing Telop analysis in this embodiment.

Reference will be had to FIG. 4 to describe the method of analysis by the Telop analyzer 124, which is one of the analysis engines of the content analyzing unit 108.

FIG. 4 is a diagram useful in describing Telop analysis in this embodiment. Reference numerals 401 to 404 in FIG. 4 denote items of video in which portions of content of a certain program have been arranged in a time series. Specifically, video 401 is that before Telop is inserted at time T, video 402 is that when Telop is inserted at time T+1, video 403 is that when Telop is inserted at time T+2, and video 404 is that after Telop is inserted at time T+3.

In this example, video 402 of time T+1 contains a specific continuous alarm and text information 405 of a news flash. The text information appears at the top of the video. The video 403 of time T+2 contains a continuous stream of Telop 406 of a news flash.

Upon detecting, by audio and video analysis, a specific continuous alarm that suddenly is heard when Telop is inserted and text information 405 that appears at the top of the video, the Telop analyzer 124 judges that Telop has been inserted. Further, the Telop analyzer 124 judges the Telop insertion time until the specific continuous alarm and the inserted text information 405 vanish.

Described next will be processing whereby the content deletion decision unit 109 determines, based upon content evaluation value, content that is to be deleted from identical items of content that have been acquired from a plurality of acquisition routes.

In this embodiment, analytical results are converted to numerical values in ten stages of from 1 to 10, where 10 is the best numerical value. For example, "RESOLUTION" is converted to a numerical value of 5, which is standard TV image quality SD (Standard Definition), or to a numerical value of 10, which is High Definition (HD). Further, "CM" is converted to a numerical value indicating how much of overall recording time is occupied by CM, and "TELOP" is converted to a numerical value indicating how much of overall recording time is occupied by Telop time. If content is devoid of CM and Telop, the numerical value is 10 for each of CM and Telop.

Further, "EVALUATION VALUE" is converted to numerical values of 1 to 10 based upon the numerical values "NOISE", "RESOLUTION", "CM" and "TELOP", where 10 is the best numerical value. In this embodiment, "EVALUATION VALUE" is calculated by averaging "NOISE": "RESOLUTION": "CM": "TELOP" at a weighting of 3:2:1:1, respectively. Accordingly, the evaluation function is given by the following formula:

$$[(\text{noise})\times 3+(\text{resolution})\times 2+(\text{CM})\times 1+(\text{Telop})\times 1]/7$$

The evaluation value of "SPORTS B" acquired by the Internet route at No. 2-1 in content group 2 (information table 203) is the following value:

$$(10\times 3+5\times 2+10\times 1+10\times 1)/7=8.6$$

Accordingly, in view of the "EVALUATION VALUE", the content deletion decision unit 109 judges that between Nos. 2-1 and 2-2, No. 2-1 gives the better quality.

It should be noted that the above-described weighting is capable of being set by the operator independently, and the evaluation function is not limited to that cited above.

The information table 302 illustrated in FIG. 3 is in a state in which content other than that judged to be of good quality has been deleted in content group 2. That is, No. 2-2 has been deleted. When "SPORTS B" is viewed, the content of No. 2-1 is applied without the awareness of the user.

It should be noted that in accordance with information table 301, it is judged that the content of No. 1-2 in content group 1 has the highest quality in comparison with the other items of content.

Thus, as set forth above, by using analytical results and an evaluation function that outputs an evaluation value, a plurality of items of content having the same semantic substance are compared with one another and content to be deleted can be determined easily and quantitatively.

Figure 5:
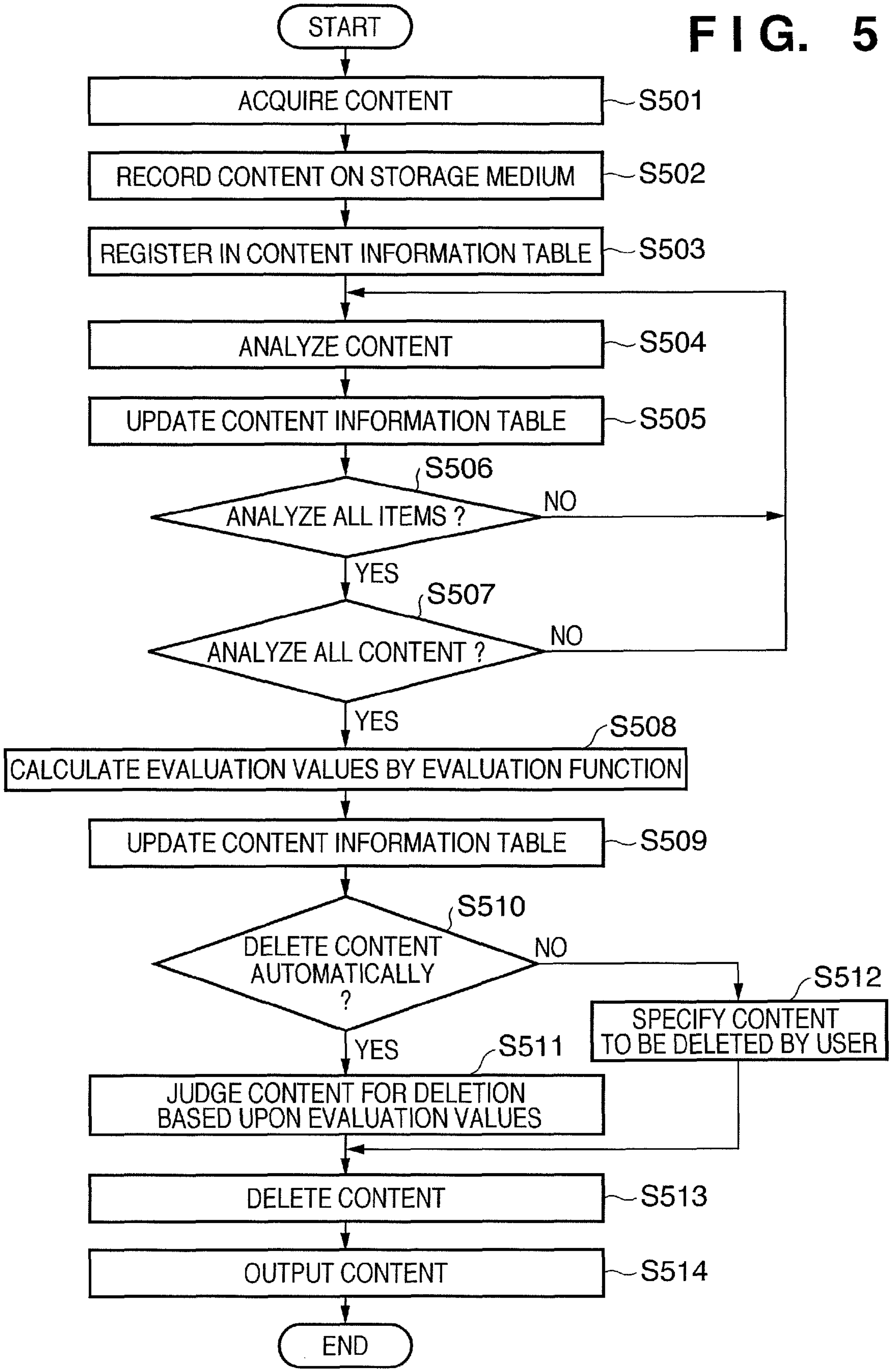
FIG. 5 is a flowchart illustrating overall processing executed by the content recording apparatus according to this embodiment.

Next, reference will be had to FIG. 5 to describe processing for acquiring identical content from a plurality of acquisition routes, analyzing and evaluating content per acquisition route and deleting unnecessary content.

FIG. 5 is a flowchart illustrating overall processing executed by the content recording apparatus according to this embodiment. First, at step S501, content of identical semantic substance specified by the user at the user setting unit 102 is acquired by a plurality of acquisition routes. The acquired content is recorded on the storage medium 104 at step S502. Then, at step S503, the information concerning the acquired content is registered in the content information table per group of content of identical semantic substance.

Next, at step S504, the content analyzing unit 108 analyzes the content by the four content analyzers 121 to 124 serving as analysis engines. Then, at step S505, the content analyzing unit 108 registers the numerical values of the results of content analysis in the content information table. Next, at step S506, the content analyzing unit 108 determines whether analysis has been completed with regard to all items. If analysis has not ended, control returns to step S504 and the above-described analysis is repeated.

On the other hand, if analysis of all items has been completed, control proceeds to step S507, where it is determined whether analysis regarding all of the content that has been registered in the content information table has been completed. Control returns to step S504 and the above-described analysis is repeated until the analysis of all content ends. When analysis of all content ends, control proceeds to step S508.

The evaluation function is applied to the numerical values of the analytical results and the evaluation values are output at step S508. The numerical-value items of the content information table are updated at step S509 in the manner illustrated in FIG. 3.

Next, at step S510, it is determined whether an automatic deletion mode implemented by the content deletion decision unit 109 has been turned on. If the result of the determination is that automatic deletion is on, then control proceeds to step S511 and the content deletion unit 106 is instructed to delete content other than that having the highest evaluation value. On the other hand, if automatic deletion is off, control proceeds to step S512. Here the analytical results and evaluation values are reported to the user and content for deletion specified by the user is indicated to the content deletion unit 106.

Next, at step S513, the content deletion unit 106 deletes the indicated content from the storage medium 104 and deletes the information concerning this content from the content information table storage unit 107. Then, at step S514, the content output unit 105 displays the content on the monitor 112.

By way of example, once a plurality of items of acquired content have been recorded on the storage medium 104, the content deletion unit 106 deletes content, which as been recorded on the storage medium 104, based upon the results of content analysis performed by the content analyzers 121 to 124.

Further, control is exercised as follows in a case where new content (content the substance of which is semantically identical) is acquired by the content acquisition unit 103 in a state in which certain content has already been recorded on the storage medium 104: The content that has been recorded on the storage medium 104 is compared with the results of content analysis by the content analyzers 121 to 124 of the content that has been acquired by the content acquisition unit 103. If, based upon the results of content analysis by the content analyzers 121 to 124, the content that has been acquired by the content acquisition unit 103 has the highest evaluation value, the content recorded previously on the storage medium 104 is deleted. Concurrently, the content that has been acquired anew by the content acquisition unit 103 is recorded on the storage medium 104.

In accordance with this embodiment, content of the same semantic content acquired from a plurality of acquisition routes is analyzed and the content is evaluated based upon the results of analysis, thereby making it possible to obtain desired content from among a plurality of items of content of the same semantic content.

Further, evaluation of content can be made more accurate by analyzing and evaluating content noise, resolution, presence or absence of commercial messages and length thereof, presence or absence of Telop and length thereof, bit rate and compression scheme.

Further, when operations relating to recording of results of content analysis and evaluation values, display of information, reference thereto and deletion are performed, management of content can be facilitated by limiting a plurality of items of content of interest.

Further, by converting evaluation of content to numerical values by an evaluation function and using the resultant evaluation values, content to be deleted from a plurality of items of content can be determined easily and quantitatively.

Furthermore, the user himself can refer to the results of evaluation and evaluation values to determine content to be deleted. As a result, desired content can be selected more flexibly and easily without checking the substance of content.

In a case where content is deleted, it is possible to eliminate the labor of selecting for deletion, one by one, a plurality of items of content of identical semantic substance, and all content can be adopted as object of deletion at one time.

Accordingly, it is no longer necessary to perform a content-quality checking operation, which has been carried out by the user heretofore, and it is possible to eliminate the time and effort that was demanded by the checking operation theretofore.

The present invention may be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a recording medium storing the program codes of the software for performing the functions of the foregoing embodiment to a system or an apparatus, reading the program codes with a computer (e.g., a CPU or MPU) of the system or apparatus from the recording medium, and then executing the program codes.

In this case, the program codes per se read from the recording medium implement the novel functions of the embodiment and the storage medium storing the program codes constitutes the invention.

Examples of recording media that can be used for supplying the program code are a flexible disk, hard disk, optical disk, magneto-optical disk, CD-ROM, CD-R, magnetic tape, non-volatile type memory card or ROM, etc.

Furthermore, besides the case where the aforesaid functions according to the embodiment are implemented by executing the program codes read by a computer, it goes without saying that the present invention covers a case where an operating system or the like running on the computer performs a part of or the entire actual process based upon the designation of program codes and implements the functions according to the embodiment.

Furthermore, after the program code read from the recording medium is written to a memory provided on a function expansion board inserted into the computer or provided in a function expansion unit connected to the computer, a CPU or the like mounted on the function expansion board or function expansion unit performs all or a part of the actual processing based upon the indications in the program, whereby the functions of the foregoing embodiment are implemented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-186975, filed Jul. 6, 2006, which is hereby incorporated by reference herein in its entirety.

What is claimed is:

1. A content recording apparatus comprising:

an input unit adapted to input a plurality of items of content, of which meaning content is the same and quality is different;

a content analysis unit adapted to analyze the plurality of items of content by converting a plurality of evaluation items for evaluating the quality of content to respective numerical values; and a recording control unit adapted to record the plurality of items of content on a storage medium, or delete content that has been recorded on the storage medium, based upon results of analysis by said content analysis unit, wherein when (a) the plurality of items of content have been input from different acquisition routes and (b) it is determined whether or not Telop exists in the plurality of items of content input from different acquisition routes and the determination is that the Telop exists, then an evaluation value of the Telop is calculated by said content analysis unit in accordance with (a) a length for which the Telop is displayed and (b) the length of the item of content.

2. The apparatus according to claim 1, further comprising a presentation unit adapted to present results of analysis by said content analysis unit to a user, wherein said recording control unit records or deletes the content designated by the user.

3. The apparatus according to claim 1, wherein said content analysis unit analyzes at least one among recorded content noise, resolution, presence or absence of commercial messages and length thereof, and presence or absence of Telop and length thereof.

4. A content recording method comprising:

inputting a plurality of items of content, of which meaning content is the same and quality is different;

analyzing the plurality of items of content by converting a plurality of evaluation items for evaluating the quality of content to respective numerical values; and recording the plurality of items of content on a storage medium, or deleting content that has been recorded on the storage medium, based upon results of analysis in the analyzing step, wherein when (a) the plurality of items of content have been input from different acquisition routes and (b) it is determined whether or not Telop exists in the plurality of items of content input from different acquisition routes and the determination is that the Telop exists, then an evaluation value of the Telop is calculated in said analyzing step in accordance with (a) a length for which the Telop is displayed and (b) the length of the item of content.

5. The method according to claim 4, further comprising presenting results of analysis in the analyzing step to a user, wherein the recording step records or deletes the content designated by the user.

6. The method according to claim 4, wherein at least one among recorded content noise, resolution, presence or absence of commercial messages and length thereof, and presence or absence of Telop and length thereof is analyzed at said analyzing step.

7. A computer-readable recording medium on which has been recorded a program for causing a computer to execute the content recording method set forth in claim 4.

* * * * *